US007337959B2

(12) United States Patent
Suerbaum

(10) Patent No.: US 7,337,959 B2
(45) Date of Patent: Mar. 4, 2008

(54) PARAMETER ELECTION METHOD WITH BALLOTING METHOD FOR THE SELECTION OF PARAMETERS IN PROTOCOLS (E.G. TANDEM FREE OPERATION TFO)

(75) Inventor: Clemens Suerbaum, München (DE)

(73) Assignee: Siemens Aktiengesellschaft, Munich (DE)

( * ) Notice: Subject to any disclaimer, the term of this patent is extended or adjusted under 35 U.S.C. 154(b) by 513 days.

(21) Appl. No.: 10/500,592

(22) PCT Filed: Jan. 24, 2002

(86) PCT No.: PCT/DE02/00238

§ 371 (c)(1),
(2), (4) Date: Jun. 29, 2004

(87) PCT Pub. No.: WO03/067909

PCT Pub. Date: Aug. 14, 2003

(65) Prior Publication Data

US 2005/0108088 A1    May 19, 2005

(51) Int. Cl.
*G06K 15/00*    (2006.01)
(52) U.S. Cl. .................... 235/383; 709/227; 709/228; 709/230; 370/431
(58) Field of Classification Search ............... 235/386; 370/431–469; 709/227, 228, 230
See application file for complete search history.

(56) References Cited

U.S. PATENT DOCUMENTS 5,506,908 A * 4/1996 Baumhauer et al. .......... 381/92

5,719,871 A * 2/1998 Helm et al. .................. 370/479
6,801,951 B1 * 10/2004 Roden, III .................. 709/248

OTHER PUBLICATIONS

"Comparison of Wireless Standards-Setting", Zixiang Tan, Syracuse University, Sep. 2001, available online at the URL http://arxiv.org/ftp/cs/papers/0109/0109100.pdf.*
"Digital Cellular Telecommunications System (Phase 2+); Inband Tandem Free Operation (TFO) of Speech Codecs; Service Description; Stage 3 (GSM 08.62 Version 8.0.1 Release 1999)", European Telecommunication Standard, Aug. 2000, pp. 1-70, XP000972321.
L. Cruchant and P. Dupuy, "Speech Quality In GSM Systems", Electrical Communication, Alcatel, Brussels, Belgium, No. Quart 4th, 1998, pp. 281-285. XP000832246.
Syuji Yasuda, Koji Uramoto, Atushi Murase, "Network Functions for the Application of Multi-rate Speech Coding in Digital Cellular Systems", Vehicular Technology Conference, 1994 IEEE 44th Stockholm, Sweden, Jun. 8-10, 1994, New York, NY, USA, pp. 306-310, XP010123106.

* cited by examiner

*Primary Examiner*—Daniel Hess
(74) *Attorney, Agent, or Firm*—Bell, Boyd & Lloyd LLP

(57) ABSTRACT

The invention relates to a method for defining parameters that are to be used for transmitting data between a first user and at least one second user, or for selecting protocol options or functions, which permits an efficient, flexible and adaptable selection of codec modes. According to said method, each user has a number of votes that can be cast for the selection of parameters, whereby a decision device determines which parameters are to be used by the users for transmitting data, according to a predetermined election method, taking into consideration the number of votes.

20 Claims, 4 Drawing Sheets

Parameter election method, variant A
Identical independent decisions for all users

A1 Exchange of parameter election information*

*) Examples:
- Maximum number of parameters
- Individual parameter weighting
- Supported parameters
- Currently used parameters

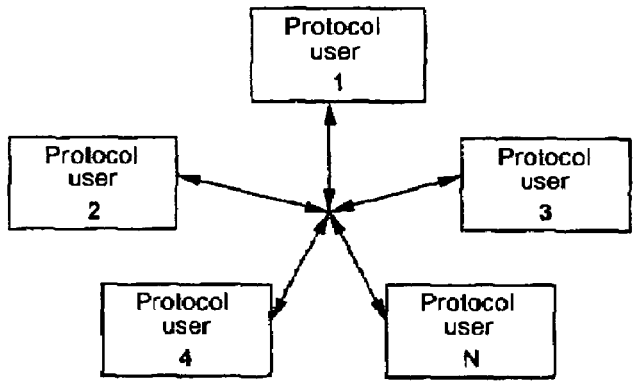

A2 Determination of parameters for each user

A2.1 Determination of the weighting factors (number of votes) of the parameters, if not defined in the protocol A2.2 Determination of the "total number of votes" per user and the "seats" to be allocated, based on the weighting factors and the offered parameters A2.3 Determination of the "voting rights" for determining the parameters to be used by the application of an election method (Example: De Hondt, St. Lauge/Schepers)

A2.4 Exercise of "voting rights" for determining the parameters to be used

A2.5 "Election result" = List of all parametes to be used

A3 Use of determined parameters by each user

Fig. 1

| Parameter election method, variant B:
| Decision at trust control centres

**B1 Transmitting the parameter election information to the control centre *)**

*) Examples:
- Maximum number of parameters
- Individual parameter weighting
- Supported parameters
- Currently used parameters

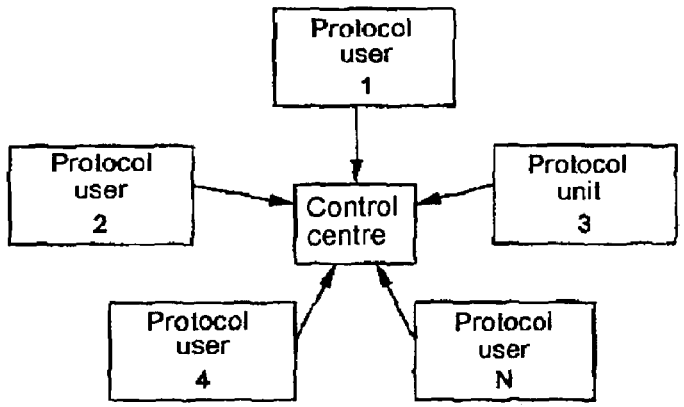

B2 Determination of parameters in the control centre (as in /

B3 Transmitting the determined parameters to each user

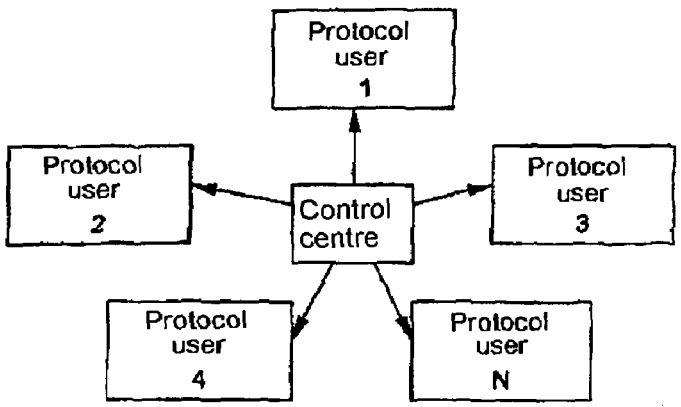

B4 Application of determined parameters at each user

Fig. 2

Example of application for AMR-WB TFO

| Mode (kbit/s) | 6.65 | 8.85 | 12.65 | 14.25 | 15.85 | 18.25 | 19.85 | 23.05 | 23.85 |
|---|---|---|---|---|---|---|---|---|---|
| Number of votes | 2 | 4 | 6 | 8 | 10 | 9 | 7 | 3 | 1 |

Fig. 3a

| Side B: | MACS=4 | | | | | | | | |
|---|---|---|---|---|---|---|---|---|---|
| ACS | 6.65 | 8.85 | 12.65 | 14.25 | 15.85 | 18.25 | 19.85 | 23.05 | 23.85 |
| SCS | 6.65 | 8.85 | 12.65 | 14.25 | 15.85 | 18.25 | 19.85 | 23.05 | 23.85 |
| Votes | 2 | + 4 | + 6 | + 8 | | | | | = 20 |

Fig. 3b

| Side A: | MACS=5 | | | | | | | | |
|---|---|---|---|---|---|---|---|---|---|
| ACS | 6.65 | 8.85 | 12.65 | 14.25 | 15.85 | 18.25 | 19.85 | 23.05 | 23.85 |
| SCS | 6.65 | 8.85 | 12.65 | 14.25 | 15.85 | 18.25 | 19.85 | 23.05 | 23.85 |
| Votes | | | | 10 | + 9 | + 7 | + 3 | + 1 | = 30 |

Fig. 3c

| St. Lague/Schepers | | | Number of allocated modes = |
|---|---|---|---|
| Mass number | A | B | Minimum(MACS(A);MACS(B)) = |
| 1 | 30 | 20 | Common MACS=CMACS=4 |
| 3 | 10 | 6,7 | |
| 5 | 6 | 4 | Election possible from common SCS |
| 7 | 4,3 | 2,8 | CSCS, see below) |

| CSCS | 6.65 | 8.85 | 12.65 | 14.25 | 15.85 | 18.25 | 19.85 | 23.05 | 23.85 |
|---|---|---|---|---|---|---|---|---|---|

Fig. 3d

| Voting right 1: | | | | | | | | | |
|---|---|---|---|---|---|---|---|---|---|
| AB chosen | 6.65 | 8.85 | 12.65 | 14.25 | 15.85 | 18.25 | 19.85 | 23.05 | 23.85 |
| Intermediate state | | | | | 15.85 | | | | |

Fig. 3e

| Voting right 2: | | | | | | | | | |
|---|---|---|---|---|---|---|---|---|---|
| BA chosen | 6.65 | 8.85 | 12.65 | 14.25 | 15.85 | 18.25 | 19.85 | 23.05 | 23.85 |
| Intermediate state | | | | 14.25 | 15.85 | | | | |

Fig. 3f

| Voting right 3: | | | | | | | | | |
|---|---|---|---|---|---|---|---|---|---|
| AB chosen | 6.65 | 8.85 | 12.65 | 14.25 | 15.85 | 18.25 | 19.85 | 23.05 | 23.85 |
| Intermediate state | | | | 14.25 | 15.85 | | 19.85 | | |

Fig. 3g

| Voting right 4: | | | | | | | | | |
|---|---|---|---|---|---|---|---|---|---|
| BA chosen | 6.65 | 8.85 | 12.65 | 14.25 | 15.85 | 18.25 | 19.85 | 23.05 | 23.85 |
| Final state = Common ACS: | | | 12.65 | 14.25 | 15.85 | | 19.85 | | |

Fig. 3h

Parameter election method, variant C:
Identical independent decisions in decision unit
allocated to each user
C1 Transmitting the parameter election information to the decision units
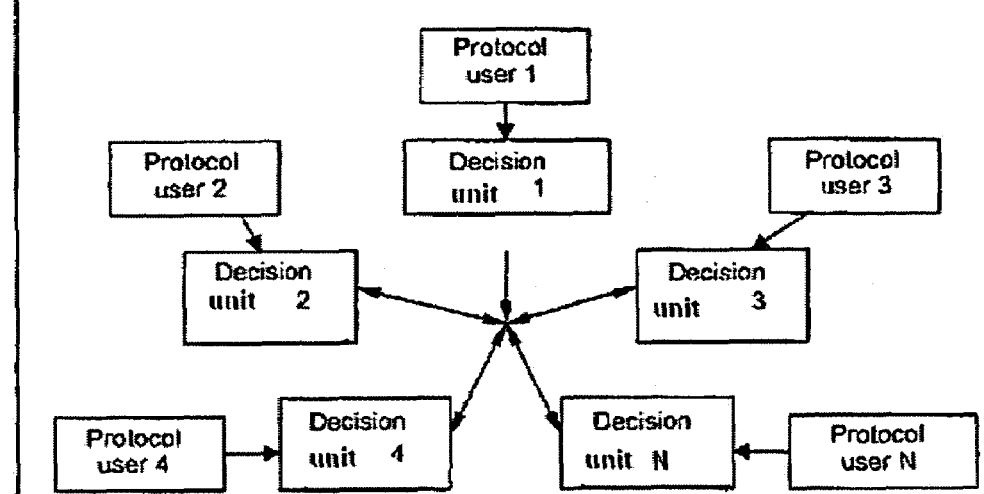
C2 Determination of parameters in each decision unit (as in A2)
C3 Transmitting the determined parameters to each user
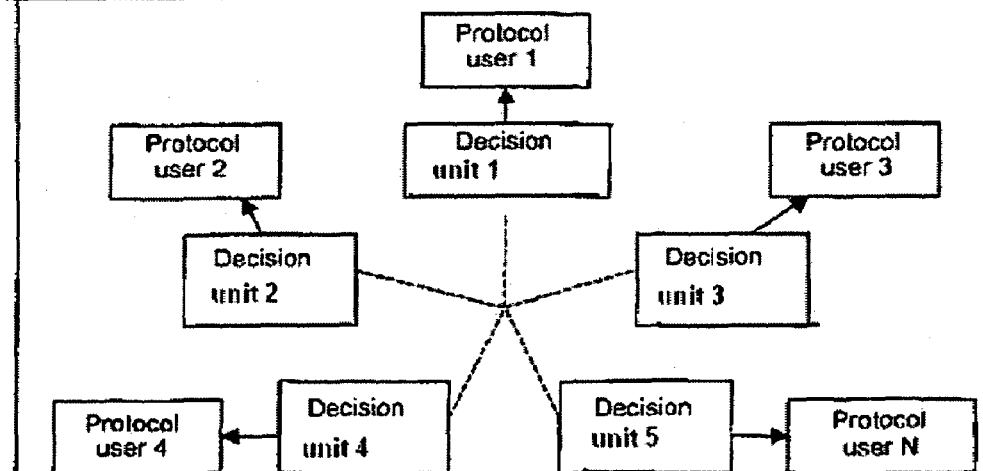
C4 Application of the determined parameters at each user
Fig. 4

PARAMETER ELECTION METHOD WITH BALLOTING METHOD FOR THE SELECTION OF PARAMETERS IN PROTOCOLS (E.G. TANDEM FREE OPERATION TFO)

CROSS REFERENCE TO RELATED APPLICATIONS

This application is the US National Stage of International Application No. PCT/DE02/00238 filed Jan. 24, 2002 and claims the benefit thereof. The application is incorporated by reference herein in its entirety.

FIELD OF INVENTION

The invention relates to a method for determining the parameters that are to be used, particularly codec modes, using TFO, for transmitting data between a first user and at least one second user using TFO.

BACKGROUND OF INVENTION

Mobile radio networks are known to the specialist from various standards such as GSM etc. When transmitting from one mobile radio user to another mobile radio user via a mobile radio network, data (voice data or other data) in accordance with predetermined parameters (relevant bit rate, coding etc., known as codecs) is transmitted in coded form on the air interface of the mobile radio network. In a Transcoder Rate Adaptation Unit (TRAU) of a base station, the data is reformatted (transcoded) (as a rule the common fixed-network PCM format etc.), is transmitted further circuit-switched or packet-switched, recoded again (transcoded) before transmission to the second user via a second air interface with the parameters known to the second user (a codec mode known to this user) into a format suitable for transmission via the air interface. The repeated re-coding impairs the voice quality. If two communicating users within a mobile radio network know of at least one similar transmission format (or defining parameters), i.e. at least one same codec, data from one telecommunication user to another telecommunication user can be transmitted without transcoding. This method of transmission, also known as tandem free operation (operation without dual tandem transcoding) increases the quality and reduces the required bandwidth, because a smaller bandwidth can be used for transcoder-free transmission than for transcoded transmission.

For a multi-rate codec AMR-WB (which divides the radio bandwidth, according to radio conditions, into wanted and protective signals and enables eight out of nine different modes) the (at least) two users exchange the modes that are to be supported for communication between them (supported codec set) and which are actually to be used (active codec set). The modes (maximum of four in GSM) on which both users agree is then determined by means of a specified algorithm. Generally the voice quality is also taken into account during this. For example, there is a rule which states that at least one of the bottom three (for AMR half-rate) or five (for AMR full-rate) modes must be present for a TFO communication.

SUMMARY OF INVENTION

The object of this invention is to provide a method that results in a well thought-out decision when choosing between the parameter sets (codec modes etc.) offered to the two users. The object is achieved by means of the independent claims.

In this way, the (at least) two users select the parameter sets which are to be used (codec modes etc.) from the parameter sets known to them, corresponding to the candidate election on the basis of an election, the method is very flexible with regard to any subsequent introduction of new parameter sets or the changing of the benchmark scales for the parameter sets.

For this purpose, a weighting, (a number of votes), can be provided for each parameter set that a user knows (e.g. codec mode). Depending on which mode a user offers to the connection in the active code set, he receives a total number of votes. The user with the most votes determines what mode is first selected from the modes that both users support (common supported codec sets, CSCS). In accordance with one voting method (corresponding for example to DeHondt or StLague/Schepers), it is determined which user can search for a mode as a second, until all the modes to be selected (the minimum of the maximum number of modes in the active code set (MACS) of the users) are allocated. In order to ensure that the method leads to the same result for all users regardless, the same procedure should be made known to both users. For example, the following can be specified for TFO: If one user offers only low and the other only high modes, the user offering the high modes must first select his lowest modes, and the user offering the lowest modes must first select his highest modes. A further example of this is where the next possible mode must be selected from an offer with the highest number of votes.

The method is particularly suitable for determining parameter sets (codec modes) for TFO in the mobile radio-communications as well as for other areas.

The method enables a dynamic selection of parameters. Furthermore, it enables the interest of at least two users to be taken into account. It can also be very flexibly adapted to adapted master conditions.

BRIEF DESCRIPTION OF THE DRAWINGS

Further features and advantages are given in the following description of an example of an embodiment, with reference to drawings. These are as follows.

FIG. 1 A method in accordance with the invention whereby an identical determination of parameter sets is effected independently by all users (MS).

FIG. 2 A further method in accordance with the invention whereby a determination of parameters (parameter sets) for the user is effected by a trust control centre.

FIG. 3 An example of the application of the method for AMR-WB TFO.

FIG. 4 A further method in accordance with the invention.

DETAILED DESCRIPTION OF INVENTION

FIG. 1 shows a plurality of users 1-N between whom data is to be transferred, whereby for the transmission of data between the users, parameters are to be negotiated which determine how the data is to be transferred (scanning rate, bandwidth, coding etc., particularly codec modes for TFO) or, for example also which options can be supported in a protocol.

For this purpose, the users disclose between themselves the number of parameter sets supported by them (number of supported codec modes, supported protocol options etc.), the individual parameter weighting, supported parameters and the parameters presently in use in step A 1, in order to prepare the parameter voting by means of an election method.

In step A 2, each user determines, in accordance with a predetermined method, the parameters to be used for the transmission of data to other users, taking account of parameter sets (codecs etc.) supported by this user and by other users. For this, a weighting factor (a number of votes) for the parameters is first determined in step A 2.1, if these are not already specified in a protocol known to all users, with the weight factors stating the number of votes a user has in each case for which parameter set (codec). Based on the weighting factors (negotiated or specified by a protocol) and the parameter sets offered by this and the other user, the total number of votes per user and the number of parameter sets to be selected are determined. In step A 2.3, the voting method to be used is determined on the basis of the number of votes available to a user in each case (whereby the user in the case of the method shown in FIG. 1 knows how many votes the users have and how they apply them). This can, for example, be similar to the DeHondt method, or another method, used to elect candidates to parliament, but used in this case for the election of parameter sets (codec modes etc.) for transmission in a mobile radio network etc.

In step A 2.4, the users (mobile stations, PDA, etc.) vote (corresponding to a parliamentary election but with a different number of votes for the voting users), but each user 1-N determining according to an identical method which user selects, e.g. which codec mode (whereby, for example, in a protocol known to all users it can be determined that each user chooses the highest (or lowest) codec mode available to him, or codec modes are given certain votes according to their level). In step A 2.5, an election result is thus obtained in the form of a list of all the parameters used by all the users 1-N (e.g. mobile radio codecs).

Then, in step A 3, the parameters determined in this way by each user 1-N are used to transmit data (voice data etc.) between the users.

In FIG. 2, instead of a (vote for) determination of the parameters in each user (mobile station, PDA etc.) in accordance with an identical method, a determination of the parameters takes place in a control centre. To do this, the information relevant to selecting the parameters is sent in step B 1 to the control centre (for instance, the examples of information given for this purpose in FIG. 2). In step B 2, a selection of the parameters (codecs etc.) takes place in the control centre.

In step B 3, the parameters determined in the control centre that can now be used for the transmission of data are sent to each user 1-N. In step B 4, the determined parameters (the available and/or actual selected codecs) are used by each user for the transmission of data (voice data etc.) to another user.

In FIG. 2, instead of a (vote for) determining the parameters in each user (mobile station, PDA etc.), a determination of the parameters in a control centre takes place in accordance with an identical method.

In FIG. 4, instead of a (vote for) determining the parameters in each user (mobile station, PDA etc.), a determination of the parameters takes place in accordance with an identical method in several decision units in the network (Transcoder (TC), Transcoder Rate Adaptor Unit (TRAU) Base Station Subsystem (BSS), Radio Network Controller (RNC) etc.) allocated to the users. For this purpose, in step C 1 the information relevant to selecting the parameters is sent to the decision units (for instance, the information given as examples for this purpose in FIG. 2). In step B 2, a selection of the parameters (codecs etc.) takes place in the decision units.

In step C 3, the parameters determined in the decision units that can now be used for the transmission of data are sent to each user 1-N. In step C 4, the determined parameters (the available and/or actual selected codecs) are used by each user for the transmission of data (voice data etc.) to one of the other users.

FIG. 3 shows an example of an application for the use of the methods for determining codecs for a TFO communication (AMR-EB-TFO) between users. Various modes are given in FIG. 3a by showing their transmission rate parameters (6, 65, 8, 85 to 23, 85 kbits/s). For example, the method can be defined so that the number of votes specified for this (2, 4, . . . , 1) are available in each case to the user that supports this mode (for example 2 votes for the first mode, 4 for the second etc.)

As shown in FIG. 3b, the first user (side B) can, for example, support the parameter sets (codec modes 6,65/8, 85/12,65/14,25/15,85/19,86 kbits/s) given under SCS and proposes the modes 6,65/8,85/12,65/14,25 shown in bold under ACS, for which he receives 2+4+6+8=20 votes.

As shown in FIG. 3c, the second user (side A) supports the modes 8,85-23,85 shown in bold under SCS and proposes the modes 15,85/18,25/19,85/23,05/23,85 shown in bold under ACS, for which he receives 10+9+7+3+1=30 votes.

Whereas (FIG. 3b, MCAS=4) the first user (B) desires a maximum of four of the modes to be used, the second user (A), according to FIG. 3c (MACS=5) would like a maximum of five of the modes to be supported. Therefore, the number of parameters to be given (modes), in FIG. 3d, is set to the minimum number of modes receiving the maximum support from the two users (minimum of 4 and 5), i.e. four, so that four parameter sets (modes) are to be selected from the four modes 8,85/12,65/14,25/15,85/19,85, given under CSCS (Common Supported Code Set) and known to both users (modes shown in bold under SCS in FIGS. 3b and 3c).

Based on the number of votes determined in FIG. 3b and FIG. 3c, who has what voting right is determined, for example in accordance with the DeHont or Stlague/schepers method etc. in this case user A has voting right 1 and voting right 3, but user B has voting right 3 and voting right 4 (i.e. for the second and fourth codec mode to be selected). In the simplest case, the voting method can be such that voting takes place alternately after the first vote.

FIG. 3e shows that B has voted for mode 15,85, which, for example, can mean that A automatically selects the largest mode (that should be known to a control centre in accordance with FIG. 2 or to all users in accordance with FIG. 1).

As shown in FIG. 3f, A now votes for mode 14,85 because, for example, it is predetermined that B votes for a mode proposed by A that is as high as possible, as a first mode.

As shown in FIG. 3g, B now votes for mode 19,85 because it is predetermined that A has supported a mode, proposed by B, that is the lowest possible (according to FIG. 3d) as a CSCS supported mode, with 19,85 being the lowest in this case.

Then, in FIG. 3h, A votes for the next highest mode proposed by A contained in the CSCS set, i.e. 12,65. This means that finally modes 12,65, 14,25, 15,85 and 19,85 have been selected and are now available or determined for the transmission of data between users. The method is very flexible and can also be used with any new codec modes introduced and be quickly adjusted to various assessments of the voice quality of the AMR-WB mode by changing the number of votes for the codec mode in the voting method.

The invention claimed is:

1. A method for defining parameters that are to be used for transmitting data between a plurality of users in a communication network, the method comprising:

providing parameters from a plurality of users in a communication network during a set up of a data transmission between the users, the parameters provided to negotiate how data is to be transferred within the network;

providing, during the setup, for each user a number of votes of the votes to be cast for the selection of parameters; and determining by a decision unit, according to a predetermined voting method and during the setup, in view of the number of votes, which parameters are to be used by the users for transmitting data.

2. The method according to claim 1, wherein
a decision unit determines which protocol options are to be used by the users for the transmission of data, in accordance with a predetermined voting method and in view of the number of votes.

3. The method according to claim 1, wherein
a decision unit determines, in accordance with a predetermined voting method, in view of the number of votes, which functionalities are to be activated by which users.

4. The method according to claim 1, the method further comprising:

defining for the transmission of data at least one of a bit rate, a data format, TFO codec mode parameters.

5. The method according to claim 1, the method further comprising:

determining the maximum number of parameters for each user; and selecting the smallest of the maximum.

6. The method according to claim 1, the method further comprising:

determining the number of votes of a user depending on the number of parameters proposed by the user or weighting of the proposed parameters.

7. The method according to claim 1, the method further comprising:

selecting parameters first for the user with highest number of votes.

8. The method according to claim 1, the method further comprising:

making a selection from the parameters of a user in accordance with a predetermined sequence.

9. The method according to claim 8, the method further comprising:

selecting first the lowest or highest parameter from the parameters proposed by this user.

10. The method according to claim 1, the method further comprising:

performing further voting for parameters in accordance with a predetermined method.

11. The method according to claim 10, the method further comprising:

performing the further voting for parameters in accordance with a predetermined method in accordance with DeHondt or StLague/Schepers.

12. The method according to claim 1, wherein the parameters that are used are AMR codec modes for a mobile radio transmission using TFO.

13. The method according to claim 1, the method further comprising:

providing for all users a decision unit, the decision unit using the same method for defining the parameters to be used for the transmission of data between the users.

14. The method according to claim 1, wherein one decision unit is deciding for all users.

15. The method according to claim 1, wherein a plurality of decision units which are assigned to the users are deciding for one or more users.

16. An apparatus for defining parameters that are to be used for transmitting data between a first user and at least one second user, the apparatus comprising:

a plurality of parameters provided from the first user during a set up of a data transmission between the first and second users;

a plurality of parameters provided from the second user during the set up;

a mechanism for providing a number of votes of the votes to be cast for the selection of parameters during the setup, for each user; and a decision unit for a decision, according to a predetermined voting method and during the setup, in view of the number of votes, which parameters are to be used by the users for transmitting data.

17. The apparatus according to claim 16, wherein the apparatus is part of a transcoder.

18. The apparatus according to claim 16, wherein the apparatus is part of a Base Station Subsystem.

19. The apparatus according to claim 16, wherein the apparatus is part of a Radio Network Controller.

20. The apparatus according to claim 16, wherein the apparatus is part of a mobile radio terminal.

* * * * *